United States Patent [19]

Hibbert et al.

[11] Patent Number: 4,804,804

[45] Date of Patent: Feb. 14, 1989

[54] THERMALLY EFFICIENT POWER BUSWAY HOUSING

[75] Inventors: David A. Hibbert, South Windsor; Anthony L. Richards, Southington; Dennis C. Zuffelato, Kensington; Conrad R. Turmelle, Farmington; Harold F. Larkin, Plainville, all of Conn.

[73] Assignee: General Electric Company, New York, N.Y.

[21] Appl. No.: 122,863

[22] Filed: Nov. 19, 1987

[51] Int. Cl.$^4$ .......................... H02G 5/06; H02G 5/10
[52] U.S. Cl. .................................... 174/16,2; 138/162; 174/68.2
[58] Field of Search ............... 174/16 B, 68 B, 70 B, 174/88 B, 99 B; 361/378; 439/114, 207, 208, 210, 212, 213; 138/157, 158, 159, 162, 166, 168

[56] References Cited

U.S. PATENT DOCUMENTS

| 3,384,856 | 5/1968 | Fisher | 439/213 |
| 3,555,293 | 1/1971 | Shannon et al. | 307/147 |
| 3,584,138 | 6/1971 | Pritzen, Jr. | 174/68 B |
| 3,761,603 | 9/1973 | Hays et al. | 138/157 X |
| 4,379,916 | 4/1983 | Flowers | 528/494 |
| 4,673,229 | 6/1987 | Jorgensen et al. | 439/207 |

Primary Examiner—Laramie E. Askin
Attorney, Agent, or Firm—Richard A. Menelly; Walter C. Bernkopf; Fred Jacob

[57] ABSTRACT

A two-piece extruded aluminum alloy housing is shaped to provide support and ground conduction facility to power busway conductors contained therein. The two-piece housing is attached together with snap-fit connectors along its top and bottom surfaces. The housing is attached to the busway power conductors by means of insulated bolts. The bolts may be hollow so that air can flow through the bolts to aid in cooling the conductors within the housing by convection.

10 Claims, 3 Drawing Sheets

THERMALLY EFFICIENT POWER BUSWAY HOUSING

BACKGROUND OF THE INVENTION

Power busway used within multi-phase electric power distribution systems generally consist of long, rectangular bars of copper or aluminum material with each individual bar electrically insulated to maintain electrical isolation between the individual phases as well as between the phase conductors and the neutral conductors. In accordance with state and local electrical codes, a ground conductor must be associated within the busway power distribution system. U.S. Pat. No. 4,673,229 entitled "Electrical Distribution System With an Improved Housing" describes a busway system that incorporates a ground bus within the busway housing. Other known busway systems use the conductive property of the steel busway enclosure to provide the required ground conductor.

To maintain electrical integrity between the separate bus conductors within the busway system which include so-called "feeder" and "plug-in" systems, while providing intimate thermal transfer between the bus conductors and the heat radiating support structure, one or more bolts are used to tightly support the bus conductors within the housing. The insulative coating on the individual bus conductors maintains the electrical integrity while the pressure applied by means of the connective bolt ensures good heat conductivity between the bus bars as well as between the bus bars and the metal support structure. U.S. Pat. No. 3,555,293 entitled "Bus Duct" describes the use of a pair of side plates that are bolted together on opposite sides of the enclosed bus conductors.

It has heretofore been the practice in the art of busway construction to avoid contacting any part of the bus conductors with the bolt or bolts that support the busway housing since the busway housing is generally at ground potential.

The use of an epoxy resin as an insulative coating for bus conductors has beneficially resulted in busway systems having good thermal transport from the bus conductors to the busway housing while maintaining the necessary electrical insulating properties therebetween.

The use of a ferrous metal housing, such as cold rolled steel for example, has both thermal and weight disadvantages. The electromagnetic properties induce eddy currents within the busway housing when the bus conductors are carrying currents in excess of several hundred amperes. The poor electrical conductive property of the ferrous metal further increases the thermal load on the busway system when ground currents are carried by the busway housing. The relatively low thermal conductivity of the ferrous metal housing reduces the rate at which the heat load generated within the housing is dissipated to the surrounding atmosphere.

The use of non-ferrous metals such as aluminum and copper has heretofore been shunned because of the relatively poor structural support properties inherent within such metals. The use of separate insulation strips between the individual bus bar conductors has heretofore discouraged bolting the bus conductors directly to the support housing because of the difficulty in aligning the holes through the insulation strips with the holes through the bus conductors and the support housing.

It has since been determined that aluminum-magnesium alloys, in extruded form, have sufficient strength properties to support copper or aluminum bus conductors, when the bus conductors are directly bolted to their respective support housing. The application of an insulative coating directly to the surface of the bus conductors provides sufficient electrical insulation to holes punched through the bus conductors without allowing electrical conduction to occur between the individual bus conductors themselves. One purpose of the instant invention is to describe a structurally sufficient busway power distribution system which includes a support structure that is light weight, and exhibits excellent thermal and electrical conductive properties.

SUMMARY OF THE INVENTION

The invention comprises a power bus support housing formed from extruded side frames made from a high strength aluminum alloy. The bus conductors and the housing side frames are apertured to receive an insulative bolt which tightly clasps the bus conductors to each other as well as to the interior surfaces of the housing side frames. An epoxy-containing insulative coating is applied directly to the surface of the apertured bus conductors to prevent electrical conduction between the bus conductors themselves as well as between the bus conductors and the housing side frames.

DESCRIPTION OF THE PREFERRED EMBODIMENT

Figure 1:
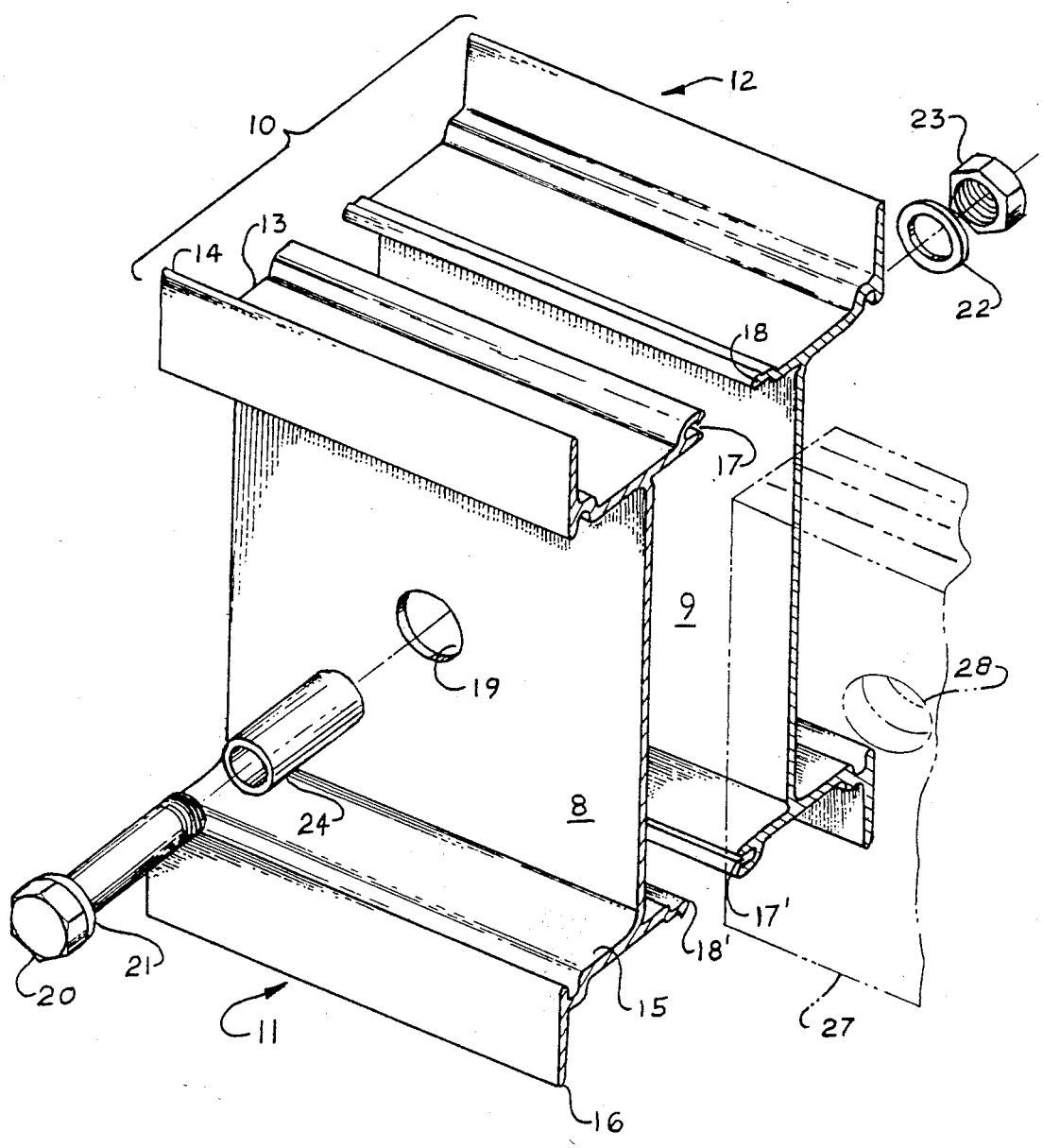
FIG. 1 is a top perspective view in isometric projection of the busway housing according to the invention prior to connecting with power bus conductors depicted in phantom.
Figure 2:
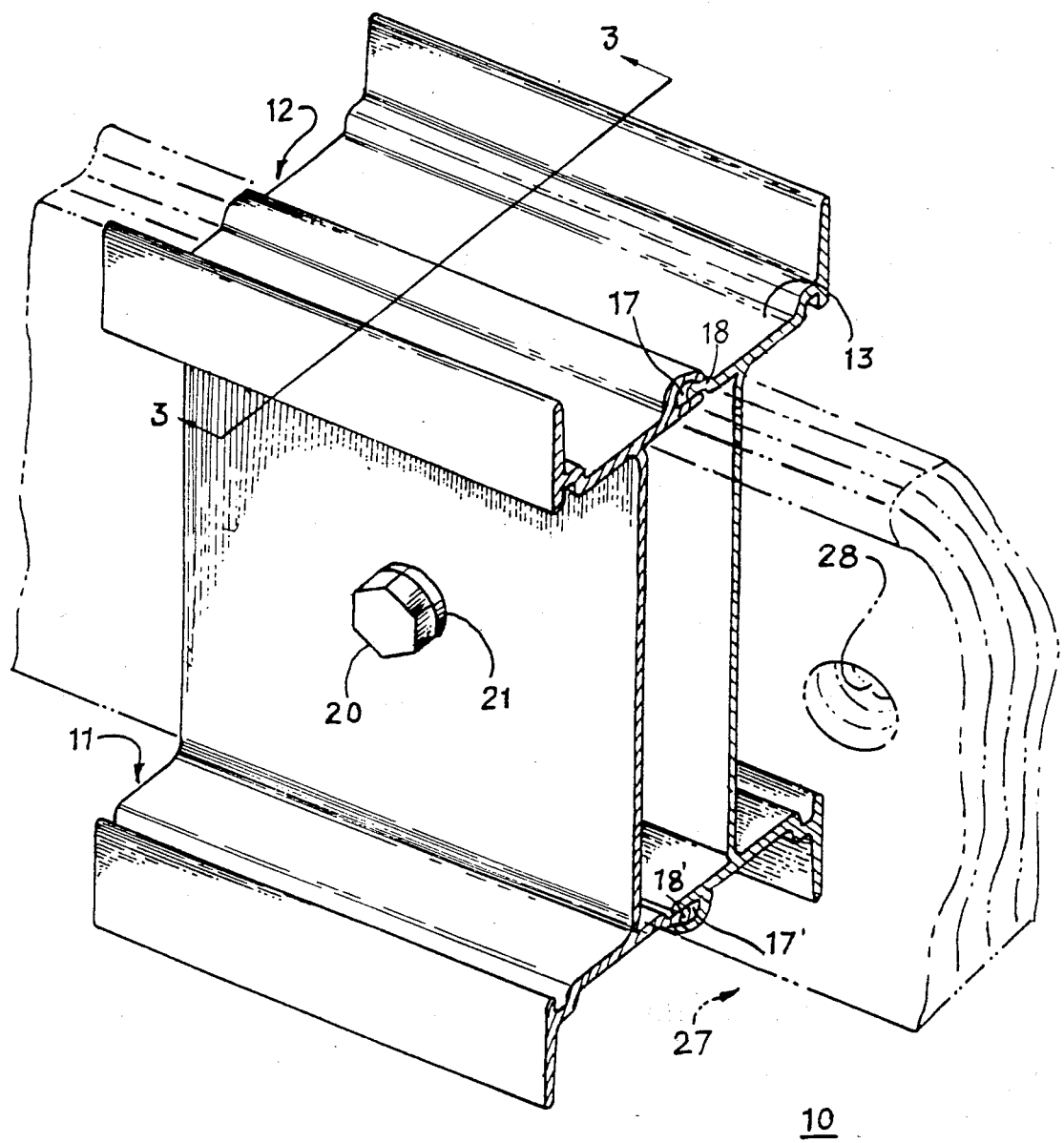
FIG. 2 is a cut-away top perspective view of the busway housing of FIG. 1 attached to the bus power conductors.
Figure 3:
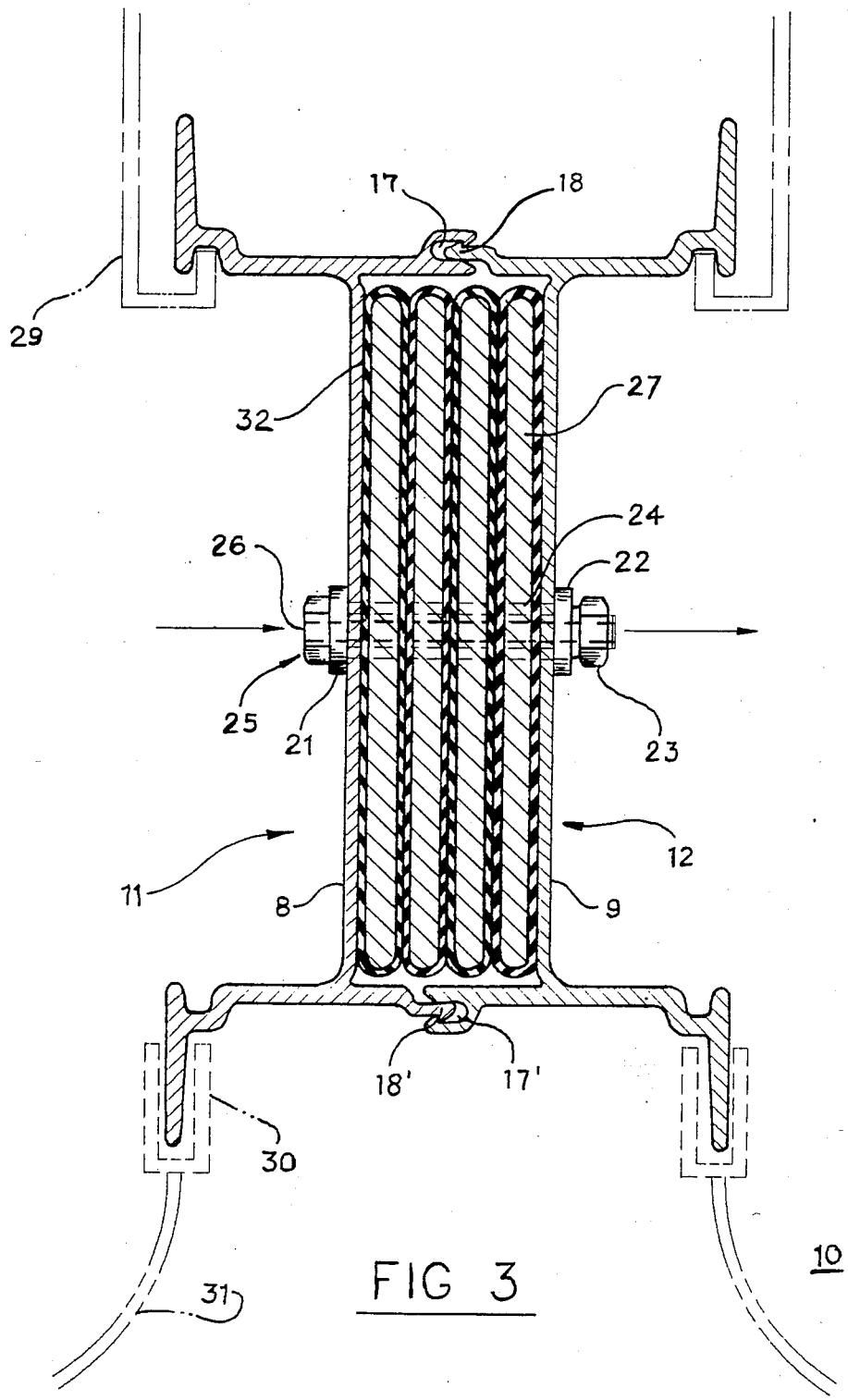
FIG. 3 is a cross-sectional view taken along the line 3—3 of the assembled busway system of FIG. 2.

The busway housing unit 10 according to the invention is shown in FIGS. 1 and 2 to consist of an extruded side plate or side piece 11 positioned opposite a complementary extruded side plate or side piece 12. The side pieces are formed from an aluminum alloy that greatly increases the tensile strength of the aluminum without substantially deterring from the good electrical and thermal properties. Both side pieces are provided with a top flange 13 and a bottom flange 15 which extend perpendicular to a flat plate 8 on side piece 11 and a flat plate 9 on side piece 12. Corresponding rails 14, 16 in turn extend perpendicular from the respective top and bottom flanges 13, 15 as indicated. The flanges and rails provide added structural support to the busway housing unit 10 and increased surface area to the side pieces for improved thermal radiation to the surrounding air. Three or four bus bar power conductors 27, hereafter "bus bars", each representing a separate phase of a three-phase power distribution system are attached to the busway housing unit 10 by aligning the thru-holes 19 formed within the respective side pieces 11, 12 with thru-holes 28 formed along the extent of the bus bars. An insulative sleeve 24 made of a pliable elastomeric material, such as silicone rubber, is next inserted within the thru holes 19, 28 and a solid aluminum alloy bolt 20 with washer 21 is inserted through the insulative sleeve. The aluminum alloy bolt is fastened to the busway housing unit by means of a washer 22 and a nut 23. The aluminum alloy bolt 20 carries the heat generated within the bus bars to the side plates 11, 12 due to the good thermal conductive properties of the aluminum alloy. In lieu of the insulative sleeve 24, a preinsulated bolt could also be employed. It is also within the scope of this invention to use a hollow steel bolt 25 which includes a passage 26 as shown in FIG. 3. The heated air generated within the busway housing unit due to the $I^2R$ losses within the bus bars 27 becomes rapidly expelled out through the opposite ends of the passage 10 because of the pressure differential caused by the heavier cooler air surrounding the busway housing unit. An angulated slot 17 extends along one edge of the top flange 13 on side piece 11 to receive a complementary angulated projection 18 which extends linearly along the top flange on the opposing side piece 12. A similar angulated slot 17' is formed on the bottom flange of side piece 12 to receive a similar angulated projection 18' formed on the bottom flange of side piece 11. The snap-fit relationship between the angulated slots and angulated projections provides increased strength to the busway housing unit in combination with the aluminum alloy bolt 20 and washer 21 described earlier. The bus bars 27 are depicted in phantom in order to show the interconnection between the angulated slots and projections on the top and bottom of the busway housing unit 10.

The convection cooling properties exhibited by the hollow steel bolt 25 is best seen by referring now to FIG. 3 where the busway housing unit 10 is depicted in its operating position held by a pair of hangers 29 depicted in phantom and connected with ground by means of a pair of ground stabs 30 attached to ground conductors 31 also depicted in phantom. In operation, the bus bars 27 with their intimate insulative coatings 32 are tightly held together by means of the hollow steel bolt 25, washers 21, 22 and nut 23. The top and bottom ends of the bus bars are tightly held by the snap-fit relation between the top angulated slots and projections 17, 18 and bottom angulated slots and projections 17' and 18'. It is noted that the insulative coatings 32 completely insulate the bus bars 27 from each other as well as from the flat plates 8, 9 on the side pieces 11 and 12. The insulative sleeve 24 serves to insulate the bus bar 27 from the hollow steel bolt 25 while the hollow steel bolt serves to thermally and electrically interconnect the opposing side pieces 11 and 12. The arrows indicate the convection path drawn through the passage 26 within the hollow steel bolt 25 by the heavier and cooler ambient air displacing the hotter air existing within the hollow bolt, as described earlier. It is noted that the aluminum alloy from which the side pieces 11, 12 are extruded is two and one-half times lighter than standard steel side pieces while exhibiting four times the thermal conductivity of steel and five times the electrical conductivity. Besides being easier to install and less expensive than standard busway housing units, it is anticipated that the thermal and electrical properties of the instant busway housing unit design will substantially reduce the voltage drop that occurs over large linear extents of standard steel supported busway units since the electrical resistance of the busway depends to a large extent upon the electrical resistance of the bus conductors. The electrical resistances, in turn, is a linear function of the temperature of the busway which, in the case of the instant invention, is substantially lower than those mounted within state of the art steel housings. The epoxy resin insulative coating is applied to the bus bars by electrostatic or fluidized bed techniques. The addition of polyvinyl acetal and phenolaldehyde resins with the epoxy such as described in U.S. Pat. No. 4,379,916 can be beneficially used as the insulative coating.

A light weight thermally and electrically conductive busway housing unit has herein been described. The unique fastening arrangement between the bus bars and the housing beneficially promotes high current transfer through the bus bars with no appreciable voltage drop.

Having thus described our invention, what we claim as new and desire to secure by Letters Patent is:

1. A power bus support housing comprising:
a pair of opposing non-ferrous metal apertured side plates, each of said plates having a U-shaped configuration consisting of a pair of top and bottom flanges joined by a plate;
means on one end of each of said flanges for interlocking said side plates together, said interlocking means comprising an angulated projection or an angulated slot;
first rails on an opposite end of one of said flanges, said first rails providing hanger support connection means; and
second rails on an opposite end of another of said flanges, said second rails providing ground stab connection means.

2. The support housing of claim 1 wherein said side plates are extruded.

3. The support housing of claim 1 wherein said non-ferrous metal is selected from the group consisting of aluminum and copper.

4. A power busway system comprising:
a pair of apertured non-ferrous metal side plates arranged on either side of a plurality of apertured bus conductors;
hollow bolt attachment means extending through said side plates and said bus conductors and holding said side plates and bus conductors in thermal proximity;
insulative means on each of said bus conductors to electrically isolate said bus conductors from each other and from said side plates; and
an insulative sleeve intermediate said attachment means and said bus conductors.

5. The power busway system of claim 4 including fastening means on said side plates comprising a pair of angulated projections and a pair of complementary angulated slots.

6. The power busway system of claim 4 wherein said insulative means comprises an epoxy coating.

7. The power busway system of claim 4 wherein said insulative sleeve comprises an elastomer.

8. The power busway system of claim 4 wherein said side plates each comprise a pair of flanges joined by a plate.

9. The power busway system of claim 8 including means at ends of said flanges for connection with hanger supports.

10. The power busway system of claim 9 including additional means at said ends of said flanges for connection with ground stab connectors.

* * * * *